United States Patent Office 3,303,714
Patented Feb. 14, 1967

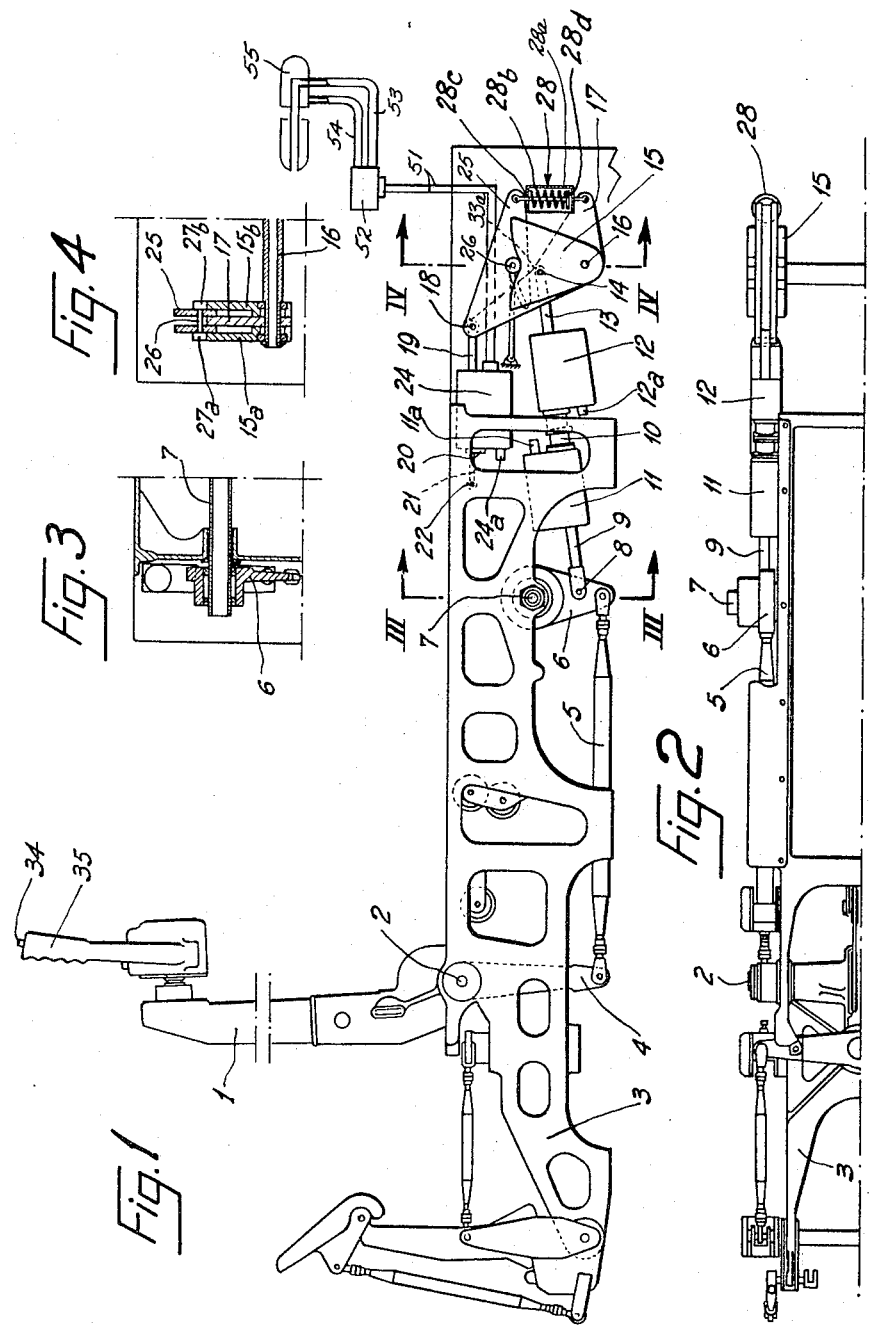

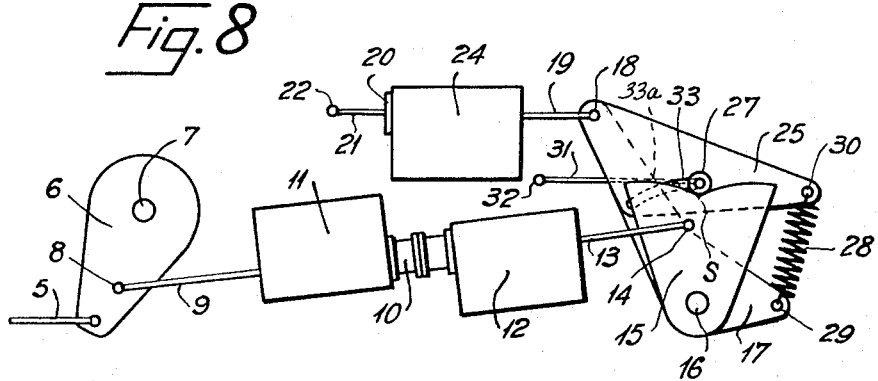
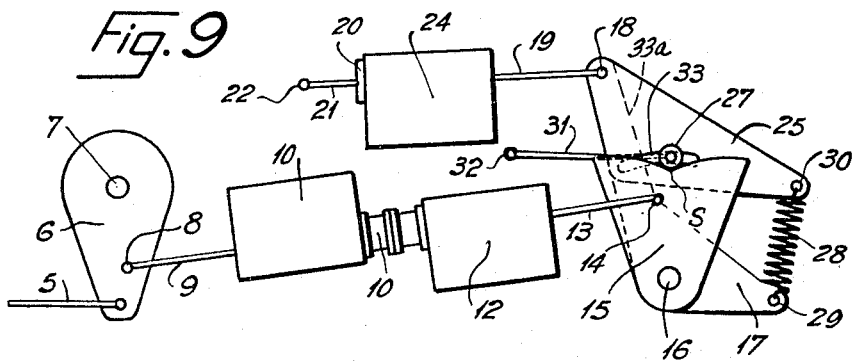
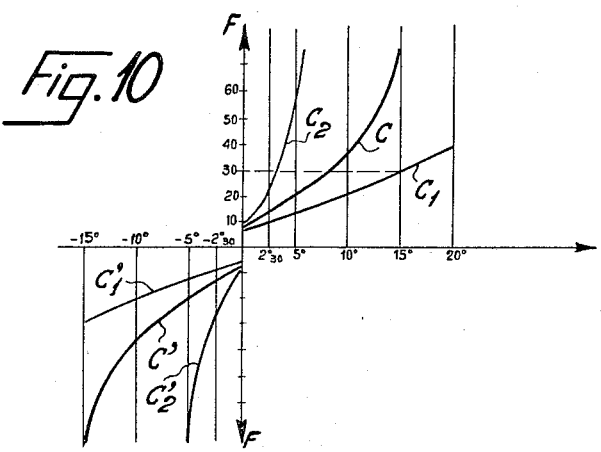

3,303,714
AIRCRAFT FEEL SIMULATOR
Jean-Claude Fontaine, Morangis, Seine-et-Oise, France, assignor to Societe Anonyme des Ateliers d'Aviation Louis Breguet, Paris, France, a company of France
Filed Dec. 22, 1964, Ser. No. 420,391
Claims priority, application France, Dec. 27, 1963, 958,701
5 Claims. (Cl. 74—470)

It is known that, in a machine such as an aircraft, when the piloting members act directly on the control surfaces, their manipulation requires of the pilot efforts which are substantially proportional to the amplitude of deflection of the control surfaces and the square of the speed of the machine.

The increase in the weight and speed of aircraft has made engineers assist the control operations for the machine more and more, and in such cases the piloting members no longer act directly on the control surfaces but transmit the pilot's commands to servo-mechanisms which in turn deflect the control surfaces.

Consequently, when he is acting on a control member the pilot no longer feels the aforesaid resistance, in accordance with the amplitude of deflection and the speed of the aircraft, and this may cause incorrect control operations which may lead to very serious accidents.

In order to remedy this, it has already been proposed to associate with the control members of an aircraft an apparatus which transmits to the said members a resistant force proportional to the amplitude of deflection of the control surfaces and to the square of the speed of the aircraft, and enabling the pilot to be given an "artificial" sensation of controlling his machine directly.

The present invention relates to an apparatus for creating artificial sensations which is particularly simple and reliable.

This apparatus comprises essentially two levers which are subjected to the action of an elastic device and the spacing of which is made dependent on a cam on which acts the control member with which the apparatus for the creation of artificial sensations is associated.

Preferably, the cam is articulated to one of the levers and it acts on the other with interposition of a train of wheels, the profile of the cam being so determined as to introduce into the system the parameter corresponding to the angle of deflection; the two levers are advantageously articulated to one another and their point of articulation can be displaced in dependence on the speed of the aircraft by a known means such as a jack controlled by a potentiometer subjected to the action of a dynamic pressure pick-up (Pitot tube), this time in order to introduce the speed factor.

Advantageously, moreover, the control member acts on the cam by means of a rod system the length of which can be modified by the pilot, in order to reduce the resistance to the actuations of the said member after having regulated the position thereof (trim) for example in order to have a fairly long flight with deflected control surfaces.

The invention is illustrated by way of example in the accompanying drawings, in which:

FIGURE 1 is a side elevational view of part of the pilot's cabin on an aircraft provided with an apparatus for the creation of artificial sensations according to the invention.

FIGURE 2 is a corresponding half-view in plan;

FIGURES 3 and 4 are respectively sectional views taken on III—III and IV—IV of FIGURE 1;

FIGURES 5 to 9 are diagrammatic views illustrating various cases of the operation of the apparatus, and FIGURE 10 gives a graph of the resistant force in dependence on the deflection angle for various values of the speed of the aircraft.

Figure 5:
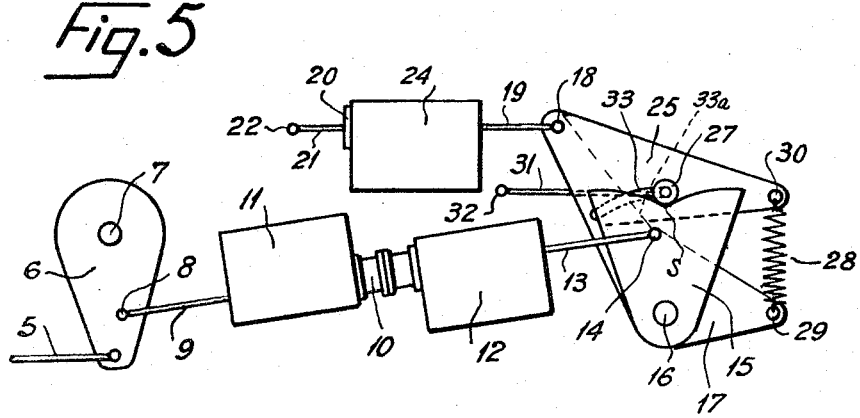

In the constructional form shown in the drawings, the joystick 1, pivotably mounted at 2 on a frame 3, is fast with an arm 4 which, by way of a transmission element such as a link 5, acts on a lever 6 pivotably mounted on the frame 3 by a transverse pin 7.

Pivotably mounted on the lever 6 by a pin 8 is a bar 9 which a jack device 10, controlled by a motor 11 and a reserve motor 12, connects to another bar 13 pivotably connected at 14 to a cam 15; the motors make it possible to shorten or lengthen, optionally, the distance separating the points of articulation 8 and 14. The jack device 10 may comprise an electrically controlled screw jack and the motors may be provided with a manually controlled emergency mechanism 11a, 12a.

In the example illustrated, the cam 15 is formed (FIGURE 4) of two twin elements 15a and 15b mounted on the transverse shaft 16 fixed to the frame, on either side of a triangular lever 17 one apex of which is articulated at 18 to a bar 19 which a jack device 20 connects to a bar 21 which is itself pivotably mounted on a fixed pivot 22 of the frame. The jack device 20 may be similar to the jack device 10, and is controlled by a motor 24 with emergency manual control 24a.

Also pivotably mounted on the pivot 18 is a twin triangular lever 25 which bears at its central portion on a shaft 26 on which wheels 27a and 27b are mounted which roll on the respective edges of the cam elements 15a and 15b (FIGURE 4).

An elastic double-action restoring device 28, comprising a container 28a pivotably mounted on the lever 17 at 29, a spring 28b and a rod 28c pivotably connected to a lever 25 at 30 and acting on a disc 28d in such a manner as to compress the spring between the disc and the end of the container, tends to make the levers approach one another and to hold the wheels in contact with the edges of the cam. The force of this restoring device may be optionally determined. The length of the spring is so chosen that the force is slight when the wheels are situated opposite the apex S of the cam.

The shaft 26 of the wheels 27 is connected by a link 31 to a fixed shaft 32 on the frame, apertures or recesses such as 33a and 33 being provided in the levers 17, 25, respectively, so as to give them the necessary freedom of movement.

In the condition of rest and zero speed of the aircraft, as FIGURE 5 shows, the wheels 27 are situated opposite the apex S of the cam, and the distance 18–22 is regulated to the minimum by the jack 20.

Figure 6:
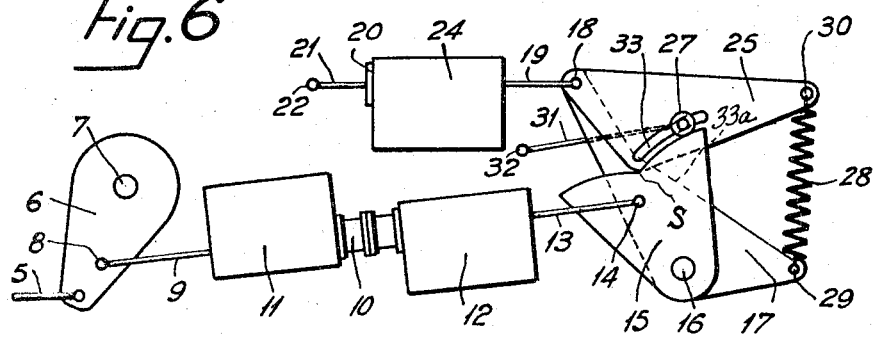

When the pilot acts on the joystick 1, for example in order to climb (FIGURE 6), the lever 6 pulls on the cam 15 and the latter, by its right-hand ramp, tends to move the ends 29 and 30 of the levers 17, 25 away from one another, subjecting the elastic device 28 to preload. The angle of deflection may be considerable, for example about 20° and more, without the effort becoming prohibitive, in both directions of action on the joystick, the profile of the cam being substantially symmetrical with respect to the point S.

In FIGURE 10, there is shown at C1, C′1 a curve of forces at zero speed which may be obtained with the apparatus according to the invention.

For a deflection of 15° in one or other direction (climbing or diving) the effort is of about 30 kg.

The purpose of the jack 20 is to modify the distance between the pivots 18 and 22 so as to introduce into the operation of the apparatus a factor proportional to the square of the speed of the aircraft.

Figure 7:
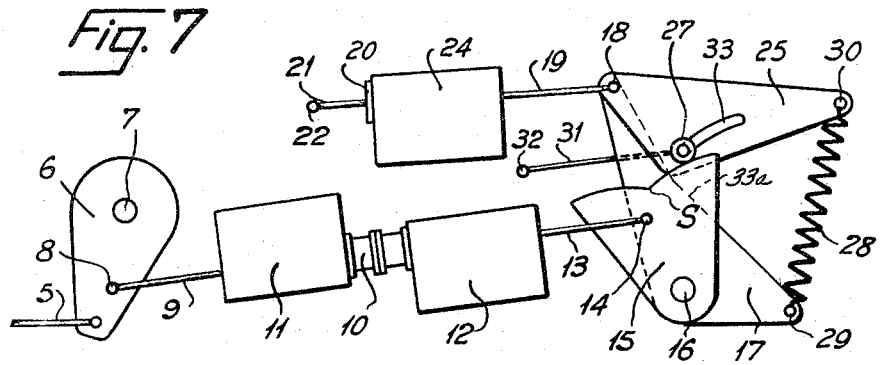

The motor 24 is then governed accordingly by a known system, such as a potentiometer 52 connected by conductors 51 subjected to a dynamic pressure pick-up, such as Pitot tube 55 connected to the potentiometer by conduits 53 and 54. In the present example, the distance 18–22 increases in proportion as the speed increases. Therefore, as FIGURE 7 shows with regard to deflection at the maximum speed provided for the aircraft, the possible angle of deflection is much smaller. This is shown by the curve C2, C'2 on FIGURE 10; the resistance opposed to the manipulation of the joystick 1 reaches 30 kg. for a deflection of approximately 3°.

For intermediate speeds, curves such as C, C' in FIGURE 10 are obtained.

The motors 11, 12 which are often referred to as "trim" motors, have the purpose of making it possible to return the wheels 27 to the top of the cam 15 without any need to modify the deflection of the control surfaces, which makes it possible more particularly to fly for a fairly long time with the control surfaces deflected without fatiguing the pilot (FIGURE 8). Thus the resistant force on the controls is diminished.

The motors 11 and 12 make it possible to return the force to the minimum for nil deflection, in dependence on the speed correction (FIGURE 9). The control of the motors 11 (and 12) is effected by means of a small button 34 provided on one of the grips of the control wheel 35 (FIGURE 1).

I claim:
1. An apparatus for the creation of artificial sensation in an aircraft, comprising in combination:
   a frame;
   a control member mounted on said frame;
   a first lever and a cam pivoted side by side on said frame;
   a transmission linkage pivoted at one end to said control member and at the other end to said cam;
   a pivot on said first lever;
   a second lever pivoted on said pivot;
   bearing means interposed between said second lever and said cam, said bearing means comprising a roller mounted on a pivot carried by a rod articulated to said frame;
   spring means for urging said second lever towards said cam;
   and variable length means connecting said pivot to a fixed point of said frame, and means for varying the length of said variable length means in dependence on the speed of said aircraft, whereby upon actuation of said control member an artificial sensation creating reaction is exerted on said member, the value of which depends on the amplitude of the action exerted on said member and on the speed of said aircraft.

2. The combination of claim 1 wherein said cam has a profile symmetrical with respect to a medial point and means are provided for modifying the length of said transmission linkage in order to allow restoration of the cam in a position wherein said bearing means are located in front of said medial point.

3. The combination of claim 1 wherein said first lever and said cam are pivoted on said frame about a common axis, said spring means being interposed between said first and second levers.

4. The combination of claim 1 wherein said variable length means are adapted to vary said length according to a non-linear function of the speed of said aircraft.

5. The combination of claim 1 wherein said variable length means comprise a jack device associated with a motor adapted to be governed in dependence on said speed.

References Cited by the Examiner

UNITED STATES PATENTS

| | | | |
|---|---|---|---|
| 2,386,402 | 10/1945 | Lilja. | |
| 2,528,752 | 11/1950 | Jacobus | 74—469 |
| 2,581,250 | 1/1952 | Garside | 74—469 |
| 2,835,461 | 5/1958 | Westbury et al. | 244—83 |
| 2,881,993 | 4/1959 | Browne | 74—470 X |
| 3,109,312 | 11/1963 | Haupt | 74—470 X |
| 3,166,272 | 1/1965 | Liddell et al. | 74—469 X |

MILTON KAUFMAN, *Primary Examiner.*

FRED C. MATTERN, *Examiner.*

D. H. THIEL, *Assistant Examiner.*